United States Patent [19]
Becker et al.

[11] Patent Number: 5,878,223
[45] Date of Patent: Mar. 2, 1999

[54] SYSTEM AND METHOD FOR PREDICTIVE CACHING OF INFORMATION PAGES

[75] Inventors: Craig Becker, Austin, Tex.; Andrew Frank-Loron, Yonkers, N.Y.; James Gordon McLean, Fuquay-Varina, N.C.; Clifford Alan Pickover, Yorktown Heights, N.Y.

[73] Assignee: International Business Machines Corporation, Armonk, N.Y.

[21] Appl. No.: 852,757

[22] Filed: May 7, 1997

[51] Int. Cl.⁶ .................................................. G06F 13/00
[52] U.S. Cl. ........................................................ 395/200.53
[58] Field of Search ........................... 395/200.3, 200.31, 395/200.32, 200.33, 200.47, 200.48, 200.49, 200.53, 200.55, 200.56

[56] References Cited

U.S. PATENT DOCUMENTS

| | | | |
|---|---|---|---|
| 5,740,430 | 4/1998 | Rosenberg et al. | 395/200.33 |
| 5,754,939 | 5/1998 | Herz et al. | 395/200.49 |
| 5,758,087 | 5/1998 | Aaker et al. | 395/200.62 |
| 5,799,150 | 8/1998 | Hamilton et al. | 395/200.33 |
| 5,802,292 | 9/1998 | Mogul | 395/200.33 |
| 5,806,065 | 8/1998 | Lomet | 395/200.53 |

Primary Examiner—Moustafa M. Meky
Attorney, Agent, or Firm—Louis J. Percello

[57] ABSTRACT

A computer, e.g. a server or computer operated by a network provider sends one or more requesting computers (clients) a most likely predicted-to-be selected (predicted) page of information by determining a preference factor for this page based on one or more pages that are requested by the client. This page is added to a local cache of predicted-to-be-selected pages in the client. Once the predicted-to-be selected page is in the cache, the client can update the appearance of the link (i.e. by changing the color or otherwise changing the appearance of the link indicator) to indicate to the user that the page represented by that link is available in the local cache.

26 Claims, 9 Drawing Sheets

PROBABILITY THAT NEXT PAGE SELECTED
WILL BE:

| CURRENT PAGE | A | B | C | D | | n |
|---|---|---|---|---|---|---|
| A | — | P(B:A)ʷ | P(C:A) | P(D:A) | | P(n:A) |
| B | P(A:B) | — | P(C:B) | P(D:B) | | P(n:B) |
| C | P(A:C) | P(B:C) | — | P(D:C) | | P(n:C) |
| D | P(A:D) | P(B:D) | P(C:D) | — | | P(n:D) |
| ⋮ | ⋮ | ⋮ | ⋮ | ⋮ | ⋮ | ⋮ |
| n | P(A:n) | P(B:n) | P(C:n) | P(D:n) | | — |

FOR EXAMPLE:
P(A:B) ≡ PROBABILITY THAT A WILL BE SELECTED NEXT GIVEN THAT B IS SELECTED CURRENTLY

FIG. 5A

| CURRENTLY SELECTED PAGE (540) | PREVIOUSLY SELECTED PAGE (550) | NEXT PAGE PROBABILITIES (560) | | | | | |
|---|---|---|---|---|---|---|---|
| | | A | B | C | D | ... | n |
| A | A | — | — | — | — | ... | — |
| A | B | — | — | P(C:B,A) | P(D:B,A) | ... | P(n:B,A) |
| A | C | — | P(B:C,A) | — | P(D:C,A) | ... | P(n:C,A) |
| A | D | — | P(B:D,A) | P(C:D,A) | — | ... | P(n:D,A) |
| A | ⋮ | ⋮ | ⋮ | ⋮ | ⋮ | ⋮ | ⋮ |
| A | n | — | P(B:n,A) | P(C:n,A) | P(D:n,A) | ... | — |
| B | A | — | — | P(C:A,B) | P(D:A,B) | ... | P(n:A,B) |
| B | B | — | — | — | — | ... | — |
| B | C | P(A:C,B) | P(B:C,B) | — | P(D:C,B) | ... | P(n:C,B) |
| B | D | P(A:D,B) | — | P(C:D,B) | — | ... | P(n:D,B) |
| B | ⋮ | ⋮ | ⋮ | ⋮ | ⋮ | ⋮ | ⋮ |
| B | n | P(A:n,B) | — | P(C:n,B) | P(C:n,B) | ... | — |
| ⋮ | ⋮ | ⋮ | ⋮ | ⋮ | ⋮ | ⋮ | ⋮ |
| n | A | — | P(B:A,n) | P(C:A,n) | P(D:A,n) | ... | — |
| n | B | P(A:B,n) | — | P(C:B,n) | P(D:B,n) | ... | — |
| n | C | P(A:C,n) | P(B:C,n) | — | P(D:C,n) | ... | — |
| n | D | P(A:D,n) | P(B:D,n) | P(C:D,n) | — | ... | — |
| n | ⋮ | ⋮ | ⋮ | ⋮ | ⋮ | ⋮ | ⋮ |
| n | n | — | — | — | — | ... | — |

135,160

FOR EXAMPLE:
P(A:B,C) ≡ THE PROBABILITY THAT A WILL BE SELECTED NEXT GIVEN THAT C IS CURRENTLY SELECTED AND B WAS PREVIOUSLY SELECTED

SYSTEM AND METHOD FOR PREDICTIVE CACHING OF INFORMATION PAGES

FIELD OF THE INVENTION

This invention relates to transfer of information over communication networks, and in particular to the transfer of discrete sets of information (pages) from one computer to another over a communication network. Still more particularly, the invention relates to a method for predictively sending discrete information pages not yet explicitly requested based upon a predicted likelihood that such pages will be selected next.

BACKGROUND OF THE INVENTION

Computerized information gathering using such entities as the World Wide Web is based around the concept of "pages" of information. A page of information consists of any number of textual, graphical, audio/visual, or other elements (i.e. multimedia information) that are sent upon receipt of a request for that particular page by a computer connected to the network from a server computer that may serve as a host repository for many such pages.

The World Wide Web is an extremely-widespread information service that can deliver both text and non-text multimedia information (audio, video, graphics). The Web is a global hyptertext system. Hypertext is a computer-based protocol for linking documents to other related documents. Links are embedded within the text of a document in the form of highlighted words or images and, when activated, cause the linked document to be retrieved and displayed. The linked document can itself contain links to other documents, and so on, ad infinitum. Links are most commonly activated by pointing and clicking with a mouse.

A computer system may be attached to an information network, such as the World Wide Web, by means of a modem or other network connecting device. Often the user is connected not directly to the information network itself but to an interim computer (network provider) with a direct connection.

The user of the requesting computer may request a specific page by sending a specific page name (such as the Universal Resource Locator, or URL, on the World Wide Web) to the network. This name is interpreted and routed to the correct server, which places the requested page data on the network for retrieval by the requesting computer. As mentioned, a page of information may contain "links" (textual or graphical pointers to other pages of information) that are available to the user of the requesting computer. If the user selects one of these links, the name of the associated information page is then requested and the process continues as described above. In this way, the user of the requesting computer can navigate the information network, requesting pages as desired.

Examples of computers communicating over a network are given in U.S. Pat. No. 5,371,852 to Attanasio et al., issued on Dec. 6, 1994. A description of network configurations that are used to identify and search for information in databases in described in U.S. patent application Ser. No. 08/677,059 to Brown et al, filed on Jul. 9, 1996, still pending. These references are herein incorporated by reference in their entirety.

The maximum possible speed of this interaction is determined by the bandwidth of the devices used to connect participating devices to the network, and to the bandwidth of the network itself. It may be noted that between the time that a given page of information is sent to the requesting computer and the time the next page is requested (i.e., while the user is viewing or otherwise using the page received), the bandwidth of the connecting devices is not being used effectively. Thus the effective bandwidth of the communication process is much lower than the potential useful bandwidth.

OBJECTS OF THE INVENTION

An object of this invention is a method and system for effectively increasing the bandwidth and apparent speed of a network connection by sending pages of information from a server computer to a requesting computer connected to a network based on a prediction by the server computer that those pages are likely to be selected next by the user of the requesting computer.

Another object of this invention is to provide a method and system for effectively increasing the bandwidth and apparent speed of a network connection by predicting pages of information that are likely to be requested by a connected requesting computer based upon historical patterns.

Yet another object of this invention is to provide a method and system for effectively increasing the bandwidth and apparent speed of a network connection by sending pages of information from an interim computer connected to a network to a requesting computer on such a network based on a prediction by the interim computer that those pages are likely to be selected next by the user of the requesting computer.

SUMMARY OF THE INVENTION

This invention allows discrete data pages to be transferred from a server computer or an interim computer (e.g. a service provider) to a requesting computer, without such pages having been specifically requested by the requesting computer, based upon the server or interim computer's estimation of the pages most likely to be requested next by the requesting computer.

The server system and/or the interim system track the patterns of requests for pages. This information is kept in the form of a table that is used to identify and/or predict those pages that are often requested following each requested page or sequence of pages. A sending process establishes communication protocol between the requesting computer and the server or interim computer. Using the table and the protocol, the server or interim computer sends the predicted next-requested pages to the requesting computer without a specific request by the user. This page is added to a local cache of predicted-to-be-selected pages in the requesting computer. Once the predicted-to-be selected page is in the cache, the requesting computer can update the appearance of the link (i.e. by changing the color or otherwise changing the appearance of the link indicator (e.g. color of text)) to indicate to the user that the page represented by that link is available in the local cache.

If the user indeed requests one of the pre-sent pages, the page information can be immediately displayed, and this event is reported to the server or interim computer, which then updates its prediction tables and predicts and begins sending additional predicted-to-be-selected pages as described above. If the user requests a non-predicted page, that page is requested and sent in the usual manner, the server or interim computer updates its prediction tables, and additional predicted-to-be-selected pages may then be sent.

BRIEF DESCRIPTION OF THE DRAWINGS

The invention will be further understood by reference to the following detailed description when read in conjunction with the accompanying drawings, wherein.

DETAILED DESCRIPTION OF THE INVENTION

Figure 1:
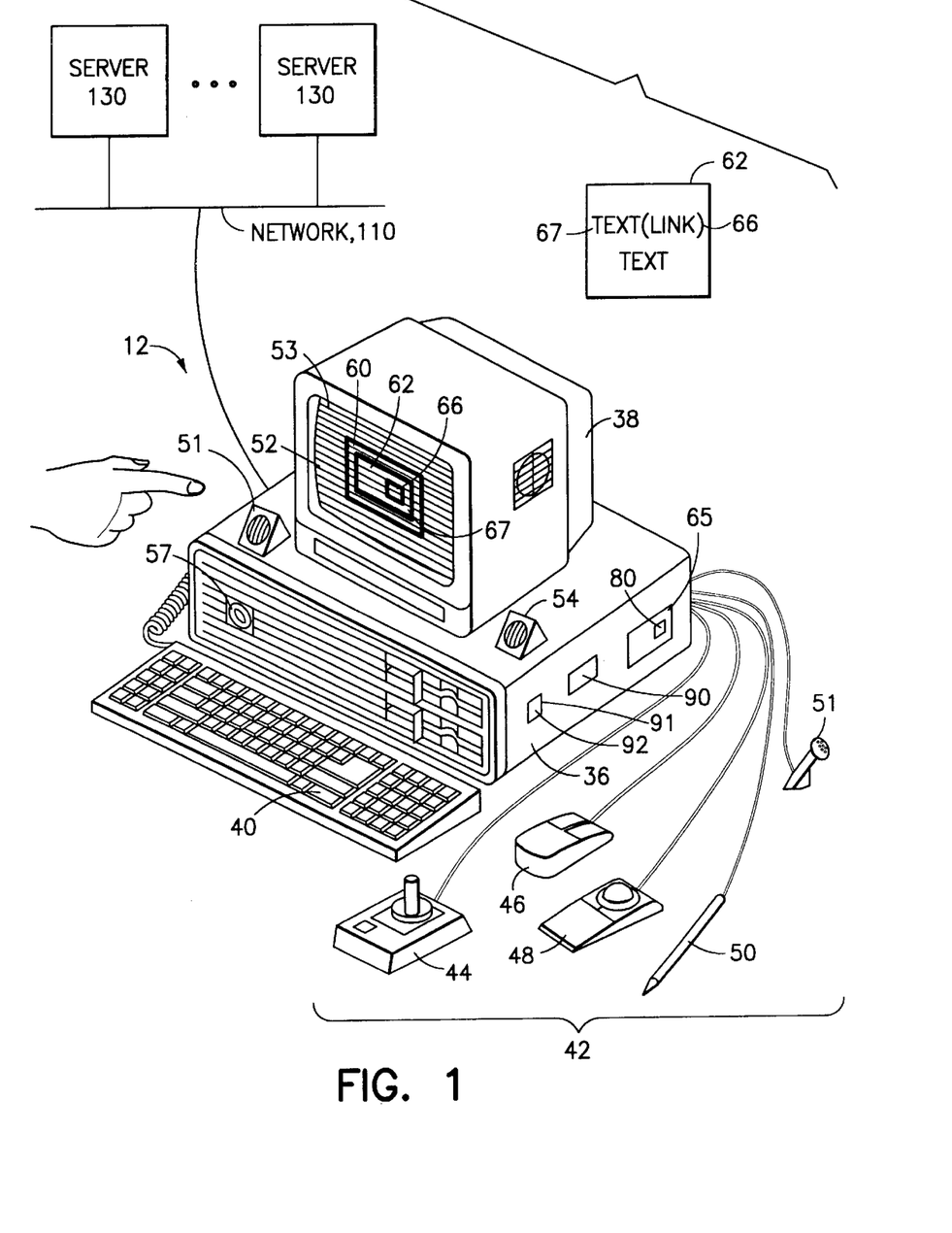
FIG. 1 depicts a pictorial representation of an example computer system that embodies the present invention.

With reference now to the figures and in particular to FIG. 1, there is illustrated a computer system in accordance with the method and system of the present invention. Typically the computer system 12 includes a computer 36, a computer display 38, a keyboard 40, and multiple input pointing devices 42. Those skilled in the art will appreciate that input pointing devices 42 may be implemented utilizing a pointing stick 44, a mouse 46, a track ball 48, a pen 50, display screen 52 (e.g. a touch display screen 52), or any other device that permits a user to manipulate objects, icons, and other display items in a graphical manner on the computer display 38. Connected to the computer system may also be audio speakers 54 and/or audio input devices 51. (See for example, IBM's VoiceType Dictation system. "VoiceType" is a trademark of the IBM Corporation.) A graphical user interface 53 may be displayed on screen 52 and manipulated using any input pointing device 42. This graphical user interface 53 may include display of an application 60 that displays information pages 62 using any known browser 90. The information pages may include graphical, audio, or text information 67 presented to the user via the display screen 52, speakers 54, or other output device. The information pages may contain selectable links 66 to other information pages 62, where such links can be activated by one of the input devices 42 to request the associated information pages. This hardware is well known in the art and is also used in conjunction with televisions ("web TV") and multimedia entertainment centers. The system 12 contains one or more memories 65 on which the invention reserves space (cache) 80 where a server 130, connected to the system 12 through a network I 10, can send predicted pages of multimedia information. Here the network 110 can be any known local area network (LAN) or wide area network (WAN), e.g., the internet.

Figure 1A:
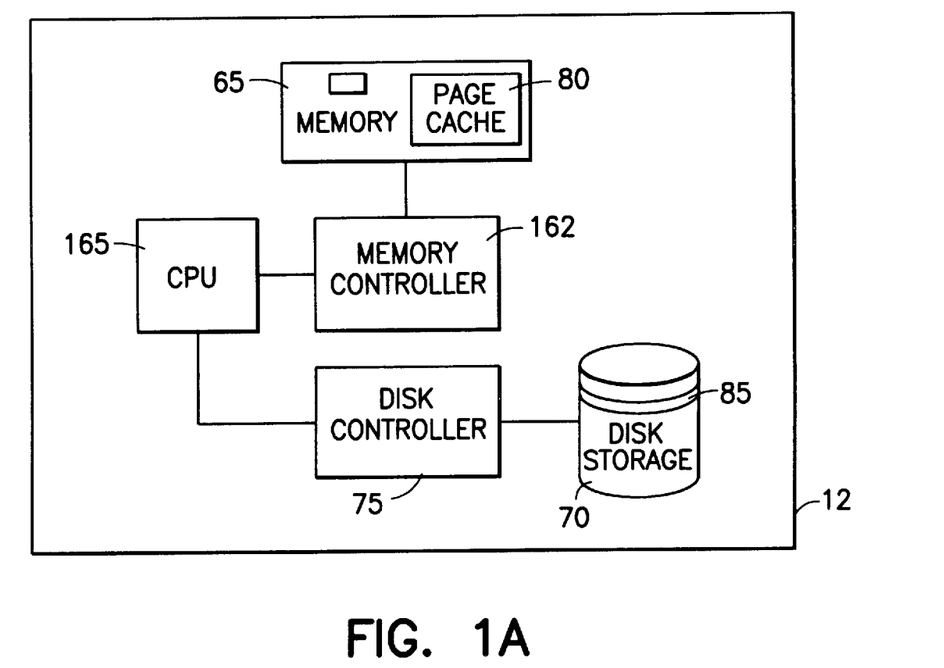
FIG. 1A is a block diagram of the computer system architecture showing a page cache.

With reference now to FIG. 1A, there is illustrated a block diagram of the architecture of the computer system 12 in accordance with the present invention. The core architecture includes a Central Processing Unit 165, memory controller 162, system memory 65, disk storage 70, and disk storage controller 75. A portion of the system memory is set aside for an information page cache 80. Additionally, file space 85 on the disk storage unit 70 may be set aside as an additional information page cache. Generally speaking, a cache is a place where data (files, images, and other information) can be stored to avoid having to read the data from a slower device, such as a remote, network-attached computer disk. For instance, a disk cache can store information that can be read without accessing remote disk storage.

Figure 2:
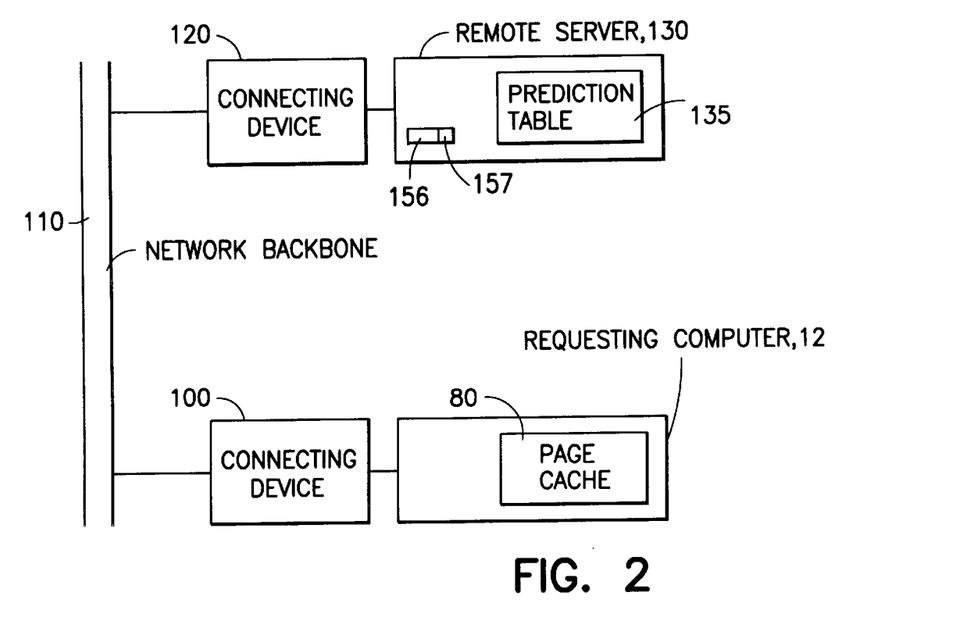
FIG. 2 is a block diagram showing portions of a computer network wherein a requesting computer and a server computer are both connected directly to the network.

With reference now to FIG. 2, there is illustrated a partial portion of a computer network in accordance with the method and system of the present invention. Computer system 12 connects to the network backbone 110 by means of a connecting device 100. Also connected to the network 110 is are one or more server computers 130 by means of their own connecting device 120. Those skilled in the art will appreciate that these connecting devices 100 and 120 may take various forms, including modems, token-ring hubs, and other network-enabling devices depending on the capabilities and technology of the connecting devices. The server computer 130 includes an area of system memory and/or disk storage space dedicated to storing and maintaining a prediction table 135, 160 (data file) which is maintained by a prediction process. (See FIG. 6 below.)

Figure 3:
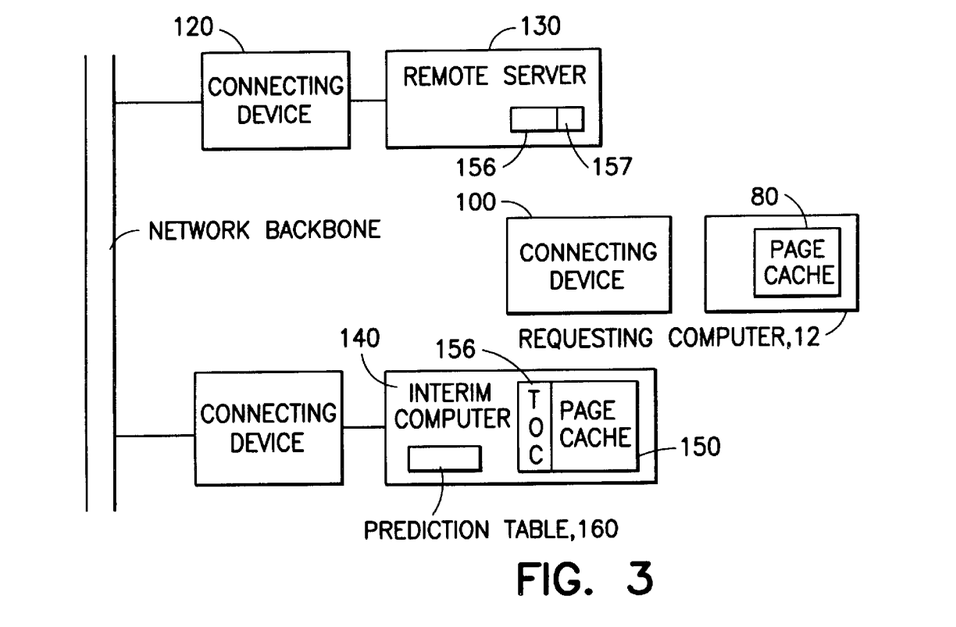
FIG. 3 is a block diagram showing portions of a computer network wherein a requesting computer is connected to the network via an interim computer.

With reference now to an alternative embodiment shown in FIG. 3, the computer system 12 is connected via its connecting device 100 to an interim computer system 140 (typically owned by a service provider) that is in turn connected to the network backbone 110. The interim computer may contain a section of memory and/or disk space dedicated to keeping a cache of pages obtained from remote servers 130, and a table of contents for this cache 155. A table of contents may simply consist of a listing of all the names, or other identifiers, of pages stored in cache to facilitate determining whether the page requested is present in the interim system page cache 150.

Additionally, the interim computer includes an area of system memory and/or disk storage space dedicated to storing and maintaining a prediction table 160 as described below. One skilled in the art will recognize this interim computer as typically belonging to an Internet Service Provider, allowing the computer system 12 indirect access to the network backbone 110. An Independent Service Provider is often a company that offers remote computer users access to various remote network information, e.g., files, software, and services database access, travel planning, web pages, and news. Pages 156 are usually addressed and found using an alphanumeric name called a Universal Resource Locator (URL) 157. For example, http://www.ibm.com is the URL for IBM's web page.

Figures 4A, 4A:
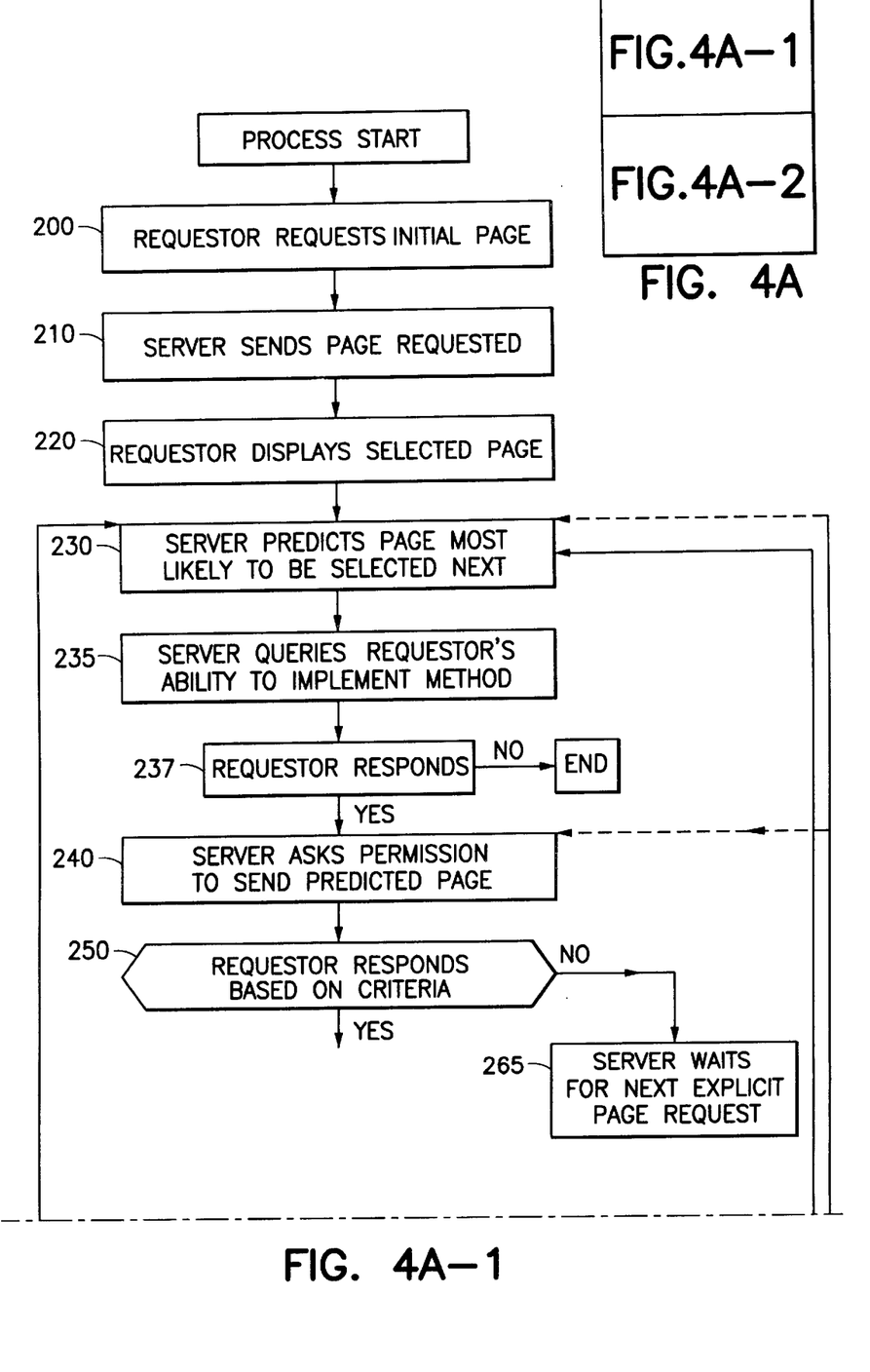
FIG. 4A is a flow chart depicting the steps performed in the communication between the requesting computer and the server computer system shown in FIG. 2.
Figure 4A:
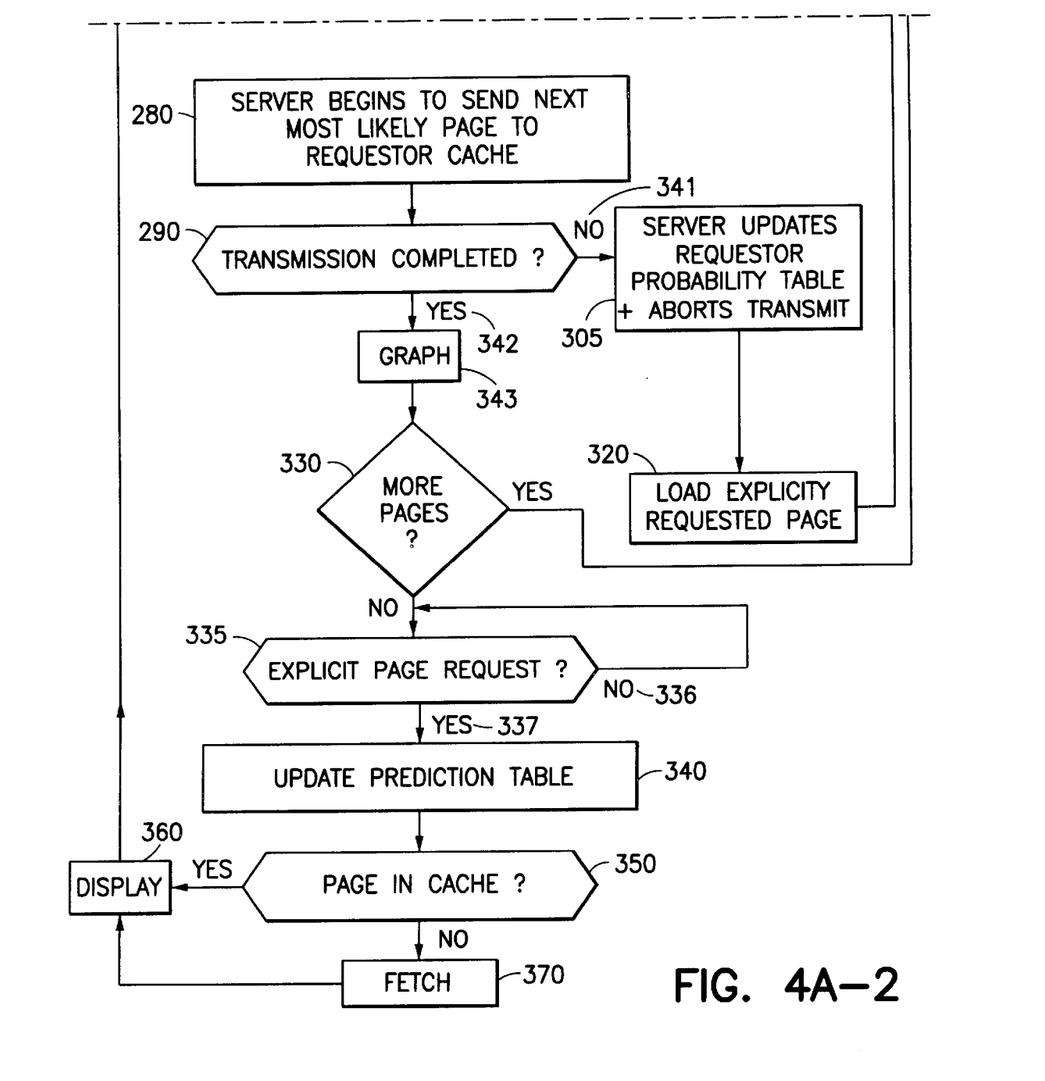
FIG. 4B is a flow chart depicting the steps performed in the communication between the requesting computer and the interim computer system shown in FIG. 3.

FIG. 4A comprises a flow chart for one preferred page sending process 400 that the server computer 130 uses to send predicted-to-be-requested pages to the requesting computer 12. Note that a requesting computer 12 may communicate with several different server computers 130 during the course of a network session. Each time a communication is established with a new server 130, the page sending process 400 is performed. The process 400 is initiated when the requesting computer 12 sends a request for a page name to the server 200. The request is typically a URL that addresses one of the pages on the server 130. The server 130 begins sending 210 the page selected to the requesting computer 12. When the page is received, the requesting computer 12 displays 220 the page of information to the user. This displaying 220 is performed by the browser 90 executing on the requesting computer 12. Using a predicting process, the server computer 130 predicts 230 the page that the user is most likely to select next. (See FIG. 6.) The server 130 then optionally sends a query 235 to the requesting computer 12 to determine whether the requesting computer is capable of receiving and storing the predicted-to-be-requested pages that the server 130 will send to the page cache 80 of the requesting computer 12. For example, if there is insufficient cache memory 80 in computer 12, then the server 130 will not send the predicted-to-be-requested pages. Such a determination is made using standard operating system methods of querying such characteristics as cache and disk storage.

The query 235 and subsequent response 237 are implemented utilizing any known host-client communication protocol is available between the computers involved. An example for the current Internet/World Wide Web connections would the be MIME-compliant HTTP protocol.

An alternative to steps 235–237 would be a pre-enabling of the caching method that occurs during the initial communications handshaking between the computers involved. Again, an example for the current Internet/World Wide Web connections would be an extension of the HTML META keyword to specify activation of this method.

Note that under some implementations, the explicit handshaking steps described in this process may be performed implicitly as part of the integrated communication protocol established between the computers involved.

In step 237, the requesting computer responds, again using whatever existing communication protocols are in effect for this connection, such as MIME-compliant HTTP for current Internet applications. (In the Multipurpose Internet Multimedia Extensions (MIME), a MIME type is a code that specifies the content type of a multimedia file. The naming of MIME types is controlled by the Internet Registered Numbers Authority (IANA). HTTP, or HyperText Transport Protocol, is the Internet standard that supports the exchange of information on the World Wide Web.) To accomplish appropriate handling of pages, the invention uses the existing MIME/HTTP protocol and specifies a new content-type for interchanging these kinds of caching messages. (As a current example, existing web browsers use "text/html" for the content-type used for standard HTML documents.) Alternatively, one may simply extend the HTML META keyword to allow the interchange of predictive caching of data between client and server; that is, the server sends the "query": <HTML><META PREDICTIVE-CACHING></HTML>and the client responds accordingly).

If the response is negative 237, the server does not send predicted-to-be requested pages, and the process 400 ends.

If the response is positive, the server then optionally queries for permission 240 to send the page predicted as next most likely to be selected. Once again, this communication is accomplished through any established means, such as MIME/HTTP.

The requesting computer 12 then determines 250 whether it will accept the page into either the memory page cache 80 or the disk page cache 85 and responds appropriately.

The requesting computer makes this determination through operating system interfaces that allow a program to determine the amount of free RAM and disk space. (For example, in the AIX operating system, the amount of remaining disk space can be determined by issuing the "df" command. The command "lscfg" provides information on how much virtual memory a machine with.)

In step 250, the requesting computer 12 may also use other criteria for determining if it will accept pages. These criteria may be stored in a file 91 on disk. For example, variables 92 may be set if the user wishes to disable this predictive-caching loading feature at a particular time of day when the network traffic is high and automatic downloading of pages would require too much time and network resource. The variables may include time ranges which the computer checks in step 250 to determine whether it will accept the page into cache 80 or 85. (For example, from 1:00 pm to 4:00 pm, periods of typically high network load, the predictive caching feature may be turned off.)

If the response in step 250 is negative, i.e., the criteria dictates that the computer 12 will not accept a (predicted-to-be-requested) page into cache (80, 85), the server 130 simply waits for the next explicit page request 265, e.g. the user explicitly clicking on a hyperlink (e.g. step 200). If the response is positive (i.e, the computer 12 will accept a predicted-to-be-requested page into cache (80, 85)), the server 130 begins to send the predicted-to-be-requested page to the requesting computer 280.

The predicted-to-be-requested page(s) are identified in the prediction table (135, 160). If 290 the transmission of the predicted-to-be-requested page is completed 342, the predicted-to-be-requested page is added to the cache (80, 85).

Text (e.g. on a web page in step 200) corresponding to links 66 to other pages that are now cached as a result of steps 280 and 290 may change 343 color or other graphical attribute (e.g. size, blinking, font, intensity) to convey to the user that a predicted-to-be-requested page is available in cache. This optional change in graphical characteristic is carried out in step 343. For example, a user may be browsing a page of shopping items containing the text: "computers," "kitchen appliances," and "golf equipment" (representing links to images and information relating to computers, kitchen appliances, and golf equipment). Once 342 the images for kitchen appliances are in cache (80,85), for example, the text "kitchen appliances" may change color to represent this availability in cache. In this example the images of kitchen appliances are the predicted-to-be-requested pages. This change in graphical characteristic 343 is useful so that users will know which links will be quick to display and which will take longer time. Note that hyperlinks 66 need not be represented by text (e.g. the words "kitchen appliances") but can be images or animations which may be selected, like text, to initiate a link to another page which may or may not be in cache. Similar to the notion of text color changes once a linked page is in cache, the image or animation representation of a hyperlink 66 may change 343 graphical characteristics once 342 a linked page is in cache (80, 85). For example, instead of the words "kitchen appliances," an image of a toaster may serve as a selectable item (e.g. hyperlink 66), and this toaster image may become animated (e.g. pop the toast) once 342 a corresponding page in cache (80, 85) as a result of the process 400, and particularly steps 280 and 290. Note that the link 66 (e.g. text or images) need not graphically change in response to the availability of a page in cache, but some other graphical representation of availability on the display screen 52 may take place. For example, the browser may contain other graphical indicators which change graphical characteristics, and/or run JAVA applets, and or pop up (i.e. display) additional information windows, and/or notify the user by audio means that a page is in cache.

With 3-dimensional (e.g. virtual reality) browsers, links 66 may consist of 3-D graphical objects that a user may interact with to initiate a link to a cached page. For example, a 3-D representation of a toaster may appear, and a user may "reach out" and "touch" the toaster, using known virtual reality methods such as tactile gloves. This "touching" is a way to select a link 66. When a page is in cache through steps 280 and 290, the 3-D graphical object may change appearance 343.

Examples of the use of tactile gloves for receiving a hand of an individual and for detecting and transmitting to the computer as input data representing orientation and movements of the hand of the individual inserted in a tactile glove are given in U.S. Pat. No. 5,320,538 by D. Baum issued on Jun. 14, 1994. This reference is herein incorporated by reference in their entirety.

One particular way in which the virtual object (i.e. 3-D object) may change appearance 343 is a change in transparency and opacity. For example, the toaster may gradually change from partially transparent to opaque to indicate the degree to which a page is in cache. For example, a page that is fifty percent loaded into cache may be fifty percent transparent. Graphical methods for changing the transparency of a 3-D object are known to those skilled in the art. Other graphical indications include the appearance of filling with water, for example as in a thermometer with its rising fluid, to indicate the degree to which a page is in cache. In these virtual reality systems, the virtual object representing a link 66 may also have tactile characteristics that change in order to reflect the fact that a page is in cache. For example, the toaster may become squishy or firm (i.e. hard) if the page represented by the toaster is in cache. Other tactile impressions such as malleability, texture, temperature, and vibrations are also possible. The degree of tactile experiences may reflect the degree to which a page is in cache.

Examples of man-machine interfaces that permit force and texture feedback (e.g. tactile sensation) are given in U.S. Pat. No. 5,184,319 by J. Kramer issued on Feb. 2, 1993. This reference is herein incorporated by reference in their entirety.

Returning to the flow chart in FIG. 4, the process next determines if 330 there are any more predicted-to-be-requested pages to be received, e.g. by sending a query to the server 130. If not, the process 400 goes to step 335. If there are, the process 400 returns to step 230. In an alternative embodiment, the server determines the amount of cache (80, 85) available in a single iteration and tracks the available cache. In this case the process returns to step 240.

However, if 290 the transmission of the predicted-to-be-requested page is not completed (e.g. interrupted) 341, for instance, because another page is explicitly requested, the predicted-to-be-requested page is not stored in the caches (80, 85), i.e., it is aborted 305. (This is carried out using standard MIME/HTTP protocols.) The server 130 then updates 305 the probability table (135, 160) based on the page that was explicitly requested. After the interruption is processed, e.g. the explicitly requested page is loaded 320, the process 400 returns to step 230.

In step 335, the process 400 determines whether or not the user is explicitly requesting a page. If not 336, the step is repeated. When a page is explicitly requested 337, the prediction table (135, 160) is updated 340 with the newly requested page. The process 400 then determines if the newly explicitly requested page is stored 350 in the cache (80, 85). If so, the page is displayed 360. If not, the browser 90 fetches 370 the page from the network 110 using well known techniques. The page is then displayed 360. After the page is displayed 360, the process returns to step 230.

An example scenario has the requesting computer 12 explicitly requesting and receiving page A from the server computer 130. The server 130 then consults 230 its prediction table (135, 160) and determines that page B is most often selected immediately following page A. Assuming the requesting computer 12 follows this protocol, the server 130 then determines that the criteria is met 250 to begin sending page B. The server begins 280, and in this example completes 290 sending page B before the user makes another explicit page request. This process occurs while the user is still viewing or otherwise using page A. If the user indeed requests page B next, the page is immediately loaded from the requesting system's cache 350 and presented 360 to the user. The server system updates 340 the prediction table, further reinforcing its prediction that selection B follows selection A. If the user instead selects page C following page A, page C must be fetched 370 from the server 130 and/or the network 110, since it has not been previously cached by the requesting system. In this case, the server system updates 340 its prediction table, increasing the predicted likelihood that C will be selected after A and decreasing the predicted likelihood that B will be selected after A.

Note that in an alternative preferred embodiment, the process 400 can be client based. To do this, as an example, the functions performed in steps 230, 235, 240, 265, 280, and 305 are performed by the client.

Figure 4B:
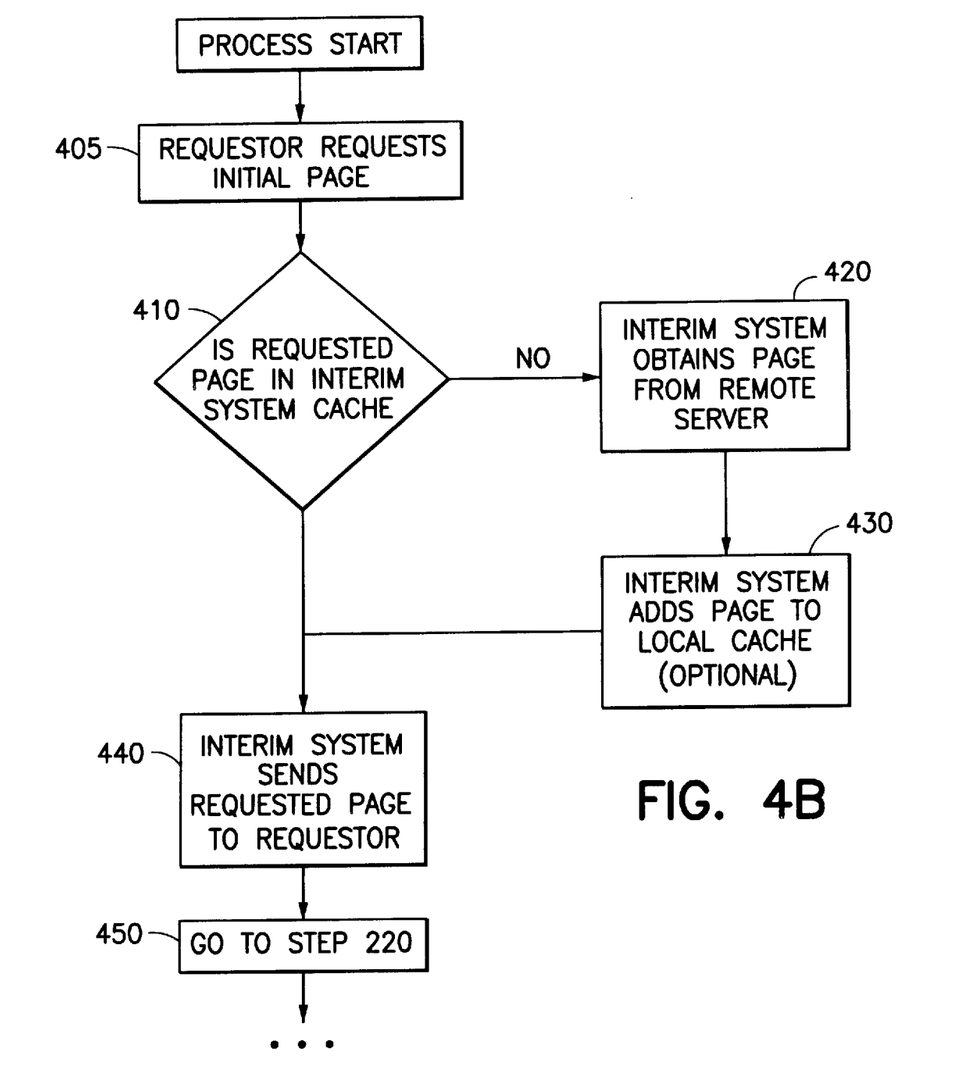

FIG. 4B comprises a flow chart showing the method steps performed where the interim computer 140 sends the predicted-to-be-selected pages to the requesting computer 12 in the configuration described in FIG. 3. Note that during a given network session, the user typically communicates directly with only one interim computer 140, which may in turn communicate with multiple remote server computers 130. Again this process is initiated when the requesting computer requests an initial page 405. In this case, the interim computer first checks 410 the cache contents 155 to determine whether the page requested is present in the interim system page cache 150. If the page is not present, the interim system obtains the page from the appropriate remote server 420, and optionally adds that page to its page cache 430. Now that page can be sent from the interim system to the requesting computer 440, which displays the page to the user 450.

If the requested page is present already, the interim system directly sends the page to the requesting computer 440.

After step 440, the process continues 450 as described above for FIG. 4A at step 220. Here the interim system 140 takes the place of the "server" 130 in the description above. For example, using a predicting process, the interim system predicts 230 the page that the user is most likely to select next (See FIG. 6.), and the interim system queries 235 requesters' ability to implement method, and so forth. The term "server" is replaced by "interim system" in steps 240, 265, 280, 305, etc.

Note that in the scenario represented in FIG. 4B differs from the scenario represented in FIG. 4A in the fact that in FIG. 4B the prediction table 160 is on the interim computer rather than the remote server. This prediction table may reflect the tastes (i.e. statistics) of a single user or multiple users of the interim computer (see FIG. 6).

It is noted that the method described may be applied simultaneously at many levels of a network; that is, an interim computer 140 may be obtaining predicted-to-be-selected pages from one or more remote servers 130 while a requesting computer may be obtaining predicted-to-be-selected pages from one or more of the interim computers 140. Here the interim computer 140 can be a large server that is connected to a plurality of local requesting computers 12 on a local area network (LAN).

Figure 5A:
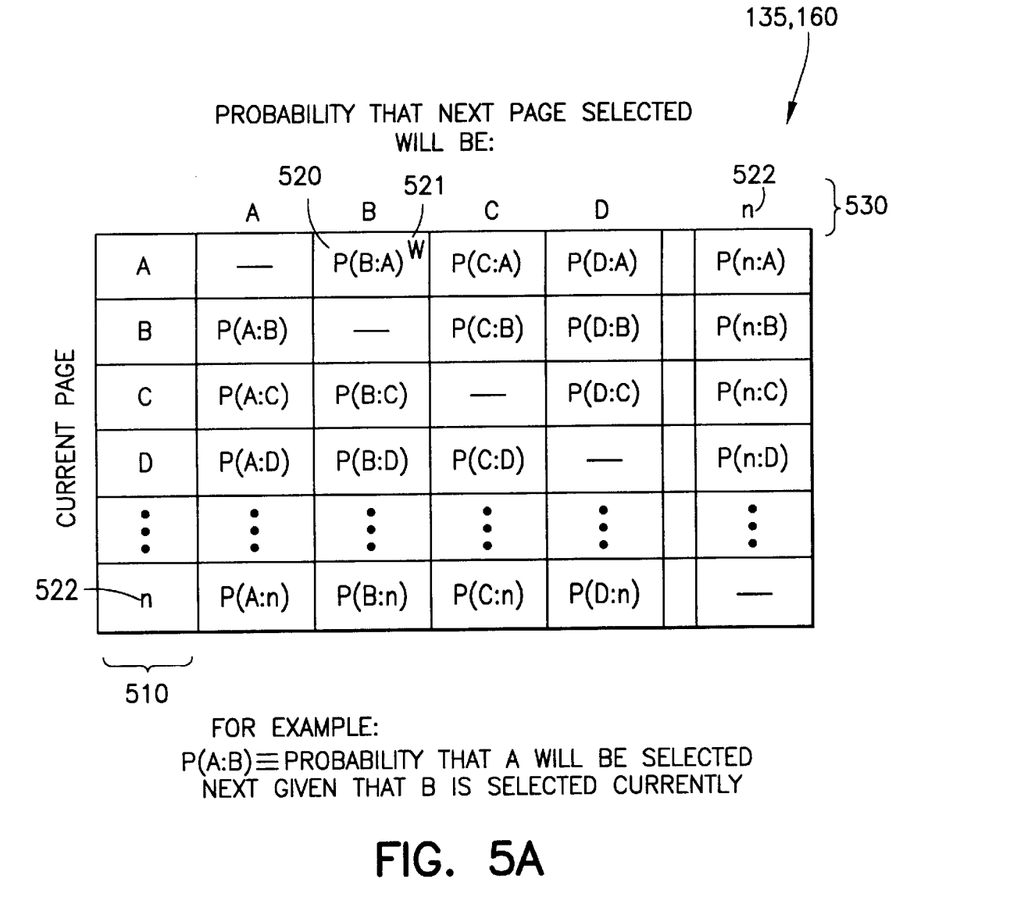
FIG. 5A is an example prediction table utilizing a single level of prediction which may be used to select information pages to be sent by the server or interim computer for caching by the requesting computer.

Referring now to FIG. 5A, illustrated is an example prediction table 135, 160 of the type described above. This table is a single-level prediction table, consisting of an n-by-n matrix where n 522 is the number of pages to be tracked. The size, n, may change dynamically as more pages are browsed by a user(s) of the systems in FIGS. 2 and 3. The incrementing of n is discussed in FIG. 6. The table will be small and grow in size as more users use the systems in FIGS. 2 and 3. Consequently, the table becomes more useful, i.e. reflective of usage patterns, the more the systems are used to browse the web.

As an example, each column in the table is associated with a particular page that may be requested next by the user. Each row in the table is associated with a particular currently-active (most recently sent) page 5 10. Each entry in the table represents a historical probability value for selection of the page represented in that column, based on the currently-active page.

For every possible current page 510, a probability calculation (P) 520 is maintained for every possible next-to-be-selected page. In order to determine the most likely (next-to-be-selected) page based upon the current selection, the server 130 or interim computer 140 chooses the page associated with a highest preference indication (e.g. highest P value) from a given row. Each time a page is actually selected, the probability table may be updated. Those skilled in the art will recognize the various straightforward mathematical methods used to calculate and update these probabilities (see description for FIG. 6 for preferred methods).

As an example, consider a simple matrix of 3 pages, A, B and C, where A is assumed to be the initial selection. In the past, B has been selected 4 times following A while C has been selected once following A. Therefore our prediction table may contains a probability value of 0.8 for B and 0.2 for C given that A is currently selected, i.e., P(B:A)= (number of selections of B)/(total number of selections considered)=4/5=0.8. Similarly, P(C:A)=1/5=0.2.

So in this example the server system would determine that B is the page most likely to be selected next by comparing the probabilities for each possible selection and taking the highest. If B is indeed the next page selected, the probability values (based on the update done in steps 305/340, e.g. adding one to column B in row A) for the entire A row are recalculated as follows: P (B:A)=(number selections of B)/(total number of selections)=5/6=0.833

P(C:A)=(number selections of C)/(total number of selections)=1/6=0.166

If, on the other hand, C is the next page selected, the probability values for the entire A row are recalculated as follows:

(B:A)=(number selections of B)/(total number of selections)=4/6=0.66

(C:A)=(number selections of C)/(total number of selections)=2/6=0.33.

Figure 6:
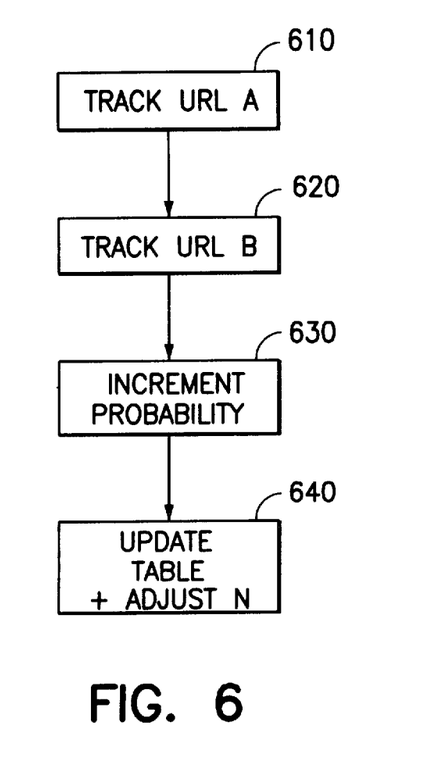
FIG. 6 is a flow chart showing the steps performed by a prediction process that creates and updates the prediction table.

Various numerical weighting schemes and variations may be used, as described in the text for FIG. 6.

Figure 5B:
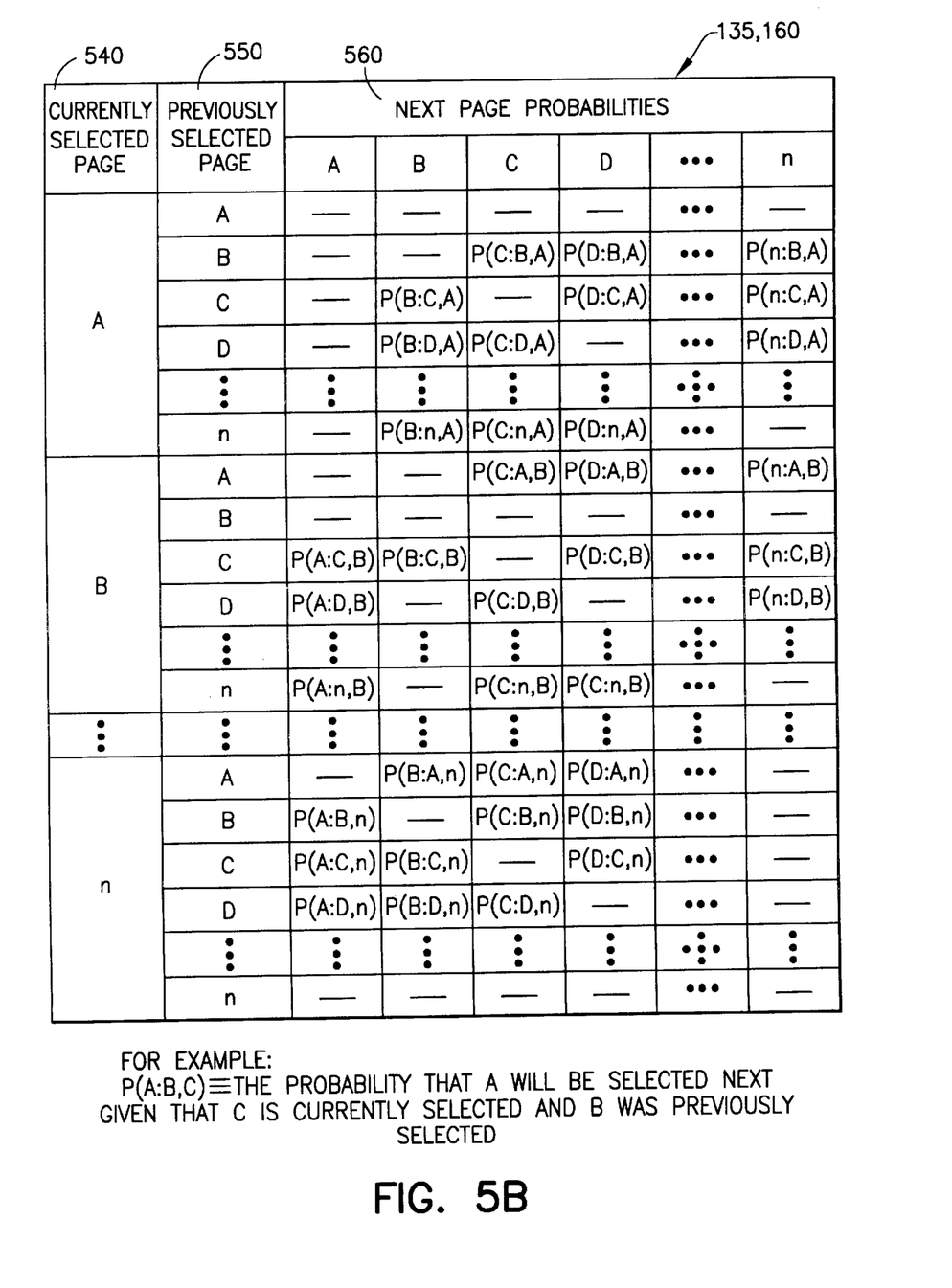
FIG. 5B is an example prediction table using two-level prediction which may be alternately be used to select information pages to be sent by the server or interim computer for caching by the requesting computer.

FIG. 5B illustrates an alternative preferred embodiment of a multi-level prediction table (in this case, 2-level), where one or more previously selected pages 540 as well as the currently selected page 550 is used to predict the likely next-to-be-selected page 560. In the multi-level tables, each column again represents a particular page that may be selected, while each row represents a particular ordered combination of previously-selected pages. As an example, P(A:B, C) is the probability that A will be selected next given that C is currently selected and B was previously selected.

This prediction approach may be extended to any level of prediction depth desired by expanding the dimension of the prediction matrix. If desired, for reasons of storage capacity or other factors, the table may be stored (i.e. distributed) over several computers. For example, half the table may be stored on computer system 1 and the other half stored on computer system 2. Accessing distributed tables may be accomplished using standard network protocols and services.

The mathematical approaches used to create and maintain the matrix are again straightforward and may be similar to those used in the example for a single-level table given above.

Multi-level prediction tables may also be used to maintain prediction values based on known information other than previous page requests. For instance, if the requesting computer's geographic location is known, one level in the table may be reserved for various geographic origins. Thus, different probability tables may be kept for west coast requesters vs. east coast requesters.

Since request patterns may change over time, the prediction calculations may be made considering only a limited number of recent requests (rolling averages). Alternatively, the entire matrix may be returned to default state (all probabilities equal) after a given amount of time.

FIG. 6 is a flow chart for the creation and updating of an example prediction table 135, 160. To create the prediction table 135, 160, the computer maintaining the table (e.g. interim computer 140) keeps track 610 of the current URL "A" 157 used by a requesting computer 12 and the URL "B" selected next 620 by that requesting computer 12, and updates the appropriate value P 520 in the table. For example, if URL B is requested after URL A, than the probability P 520 in table 135, 160 is incremented 630, P(B:A))=P(B:A)) +c, where c is an increment value, and the new larger value stored 640 in the table. The larger value for P reflects its new likelihood value, or probability, specifying the higher probability event B-selected-after-A occurring again in the future. If a URL is not in the table, it is added, and the number n (522 in FIG. 5) is incremented. In this invention, we use the term "probability" loosely to indicate a preference. In this example, a preference ordering value for P 520 is actually stored in the table; however, these values 520 may be converted to true probability, if useful, by dividing the values 520 by the total of summed values in the table.

The values P 520 may be weighted by various categories, statistics and parameters such as: time, age group of user browsing the web, statistics about users (customers), income level, geographic region, etc. More recently-browsed web sites may be have a higher weighting than ones browsed weeks in the past. For example, a weight W 521 may be used to multiply the values P 520 according to various criteria. Additionally, the system can create and update a separate probability table for each category to be used.

Values 520 can be set to zero to discourage viewers of a household (or entire subscriber base for the Internet Services Provider) from viewing pornography or other material. For example, in step 290 a page would have zero probability and therefore never be predictively cached. These values 520 may be set to zero by manual intervention by the service provider or by automatic intervention by the computer each time it attempts to update the probability table, as in step 300.

In a typical scenario, a person using requesting computer 12 accesses the web to research a product. The person requests a page 156 (specified by a URL 157) which contains the text of a press release about the product. From this page are links to other pages containing images of that product. Before the user requests these other pages, the computer maintaining the table (e.g. interim computer 140) sends the images, which may be contained on another page 156, to a page cache (150 or 80). In this way, should the user select a page containing the images, the images will be more quickly available than if they were not just placed in the cache. This invention may have particular use in commercial transactions and in applications that require the sending of large data files such as images and animations.

Since user behavior patterns change with time, the prediction table 135, 160 may store probability values 520 within a recent period of time. This may be accomplished, for example, by using multiple tables 135, 160 for different periods of time. Older tables may periodically be discarded, and newest tables used. In other words, step 640 in FIG. 6 may apply to a specific table 135, 160 in a set of tables.

In cases where there are several interim computers 140, each computer may keep a separate prediction table 135, 160 thus reflecting regional variations in web usage. For example, this is useful because different countries in the world may have different habits, interests, and buying patterns for commercial applications. Several interim computers 140 are sometimes used to provide reliability in the event that one interim computer stops working, and also to speed transactions among computers which may be located at different locations around the world.

Although the caching of pages and images is currently available using various standard web browsers, such as Netscape, so that users can access previously-accessed information quickly, these web browsers do not provide predictive caching as described herein.

Given this disclosure, alternative equivalent embodiments with respect to methods of predicting likely-to-be-selected pages based on historical patterns would become apparent to one skilled in the art. These embodiments are also within the contemplation of the inventors.

We claim:

1. A computer server capable of being connected to a network through a network connection, the network connected to one or more other servers and one or more clients, the computer server comprising:

a central processing unit and one or memories with one or more pages of information, one or more of the pages being requested pages when requested by one or more of the clients through the network connection;

a preference table in one or more of the memories that is updated when one or more of the requested pages are requested, the preference table associating a preference factor with one or more predicted pages with respect to one or more of the requested pages;

a prediction process that selects one or more of the predicted pages using the respective preference factor for one or more requested pages; and a sending process that sends the selected predicted pages to one or more of the clients that requested the respective requested page.

2. A computer, as in claim 1, where the predicted pages are sent only if one or more criteria are met.

3. A computer, as in claim 2, where the criteria include any one or more of the following: a permission signal sent by the client to the server computer indicating that the client has sufficient memory to store the predicted page, the requested page is requested in a specified period of time, network use, and there is not a "no preference" preference factor related to the predicted page.

4. A computer, as in claim 1, where the preference factor can be any one of the following: a probability the predicted page will be selected after the requested page is selected, a weighted probability, and a probability that the predicted page will be selected after a set of two or more requested pages are selected.

5. A computer, as in claim 1, where sending process terminates sending the predicted page if another request for a requested page is received.

6. A computer, as in claim 1, where the preference table has one or more predicted pages that are obtained from one or more servers on the network.

7. A computer, as in claim 6, where a copy of the requested page and one or more associated predicted pages is stored in the memory and sent to the client by the sending process.

8. A system, as in claim 1, where the preference factor for one or more the predicted pages is determined from a a sequence of two or more requested pages.

9. A computer, as in claim 8, where the preference factor is further determined by other factors.

10. A computer, as in claim 9, where the other factors include: the geographic location of the client, a profile a user of the client, a time, a network usage, and marketing information.

11. A computer, as in claim 10, where the profile includes any one or more of the following: income, geographic region, age group, gender, spending habits, and marketing data.

12. A computer, as in claim 8, where one or more of the preference factors is weighted.

13. A computer, as in claim 12, where one or more of the preference factors is weighted so one or more of the predicted pages is not selected.

14. A computer, as in claim 1, where one or more of the predicted pages is stored in a cache memory in one or more of the clients.

15. A computer, as in claim 14, where an indicator associated with a predicted page changes after the predicted page is stored in cache memory.

16. A computer, as in claim 15, where the indicator is an audio indicator.

17. A computer, as in claim 15, where the indicator is a tactile indicator.

18. A computer, as in claim 15, where the indicator is a visual indicator.

19. A computer, as in claim 18, where the indicator is a hyperlink representation.

20. A computer, as in claim 18, and the visual indicator changes one or more of the following graphical attributes: color, size, intensity, font, shading, blinking, animation, transparency, and shape.

21. A computer, as in claim 18, where the indicator is one or more virtual reality objects.

22. A computer, as in claim 21, where the indicator is three dimensional.

23. A computer, as in claim 1, where the preference table size changes as more pages are browsed by one or more users.

24. A method of sending pages of information between computers connected to a network, comprising the steps of:

receiving a request for a requested page;

determining a preference factor from a preference table in one or more of the memories that is updated when one or more of the requested pages are requested, the preference table associating one of the preference factors with one of the predicted pages with respect to one or more of the requested pages;

selecting one or more of the predicted pages using the respective preference factor for one or more requested pages; and sending the selected predicted pages to one or more of the clients that requested the respective requested page.

25. A computer server capable of being connected to a network through a network connection, the network connected to one or more other servers and one or more clients, the computer server comprising:

means for receiving a request for a requested page;

means for determining a preference factor from a preference table in one or more of the memories that is updated when one or more of the requested pages are requested, the preference table associating one of the preference factors with one of the predicted pages with respect to one or more of the requested pages;

means for selecting one or more of the predicted pages using the respective preference factor for one or more requested pages; and means for sending the selected predicted pages to one or more of the clients that requested the respective requested page.

26. A method of receiving pages of information over a network, comprising the steps of:

sending a request over the network for a requested page;

determining a preference factor from a preference table that is updated when one or more of the requested pages are requested, the preference table associating one of the preference factors with one or more predicted pages with respect to one or more of the requested pages;

selecting one or more of the predicted pages using the respective preference factor for one or more requested pages; and sending a request for the selected predicted pages over the network.

* * * * *